INVENTORS
HILMAR SCHÖNEMEYER
HELMUT WILLRETT
BY [signature]
ATTORNEY

Oct. 27, 1970 H. SCHÖNEMEYER ET AL 3,536,849

MULTI-STAGE CROSSPOINT SWITCHING NETWORK WITH HOMOGENEOUS TRAFFIC PATTERN

Original Filed April 30, 1964 3 Sheets-Sheet 2

| 1-20 | 21-40 | 41-60 | 61-80 | Σ | TOTAL OUTPUTS V2 |
|---|---|---|---|---|---|
| a | a | a | a | 20 + 20 + 20 + 20 | 80 |
| a | a | a | b | 20 + 20 + 20 + 10 | 70 |
| a | a | a | c | 20 + 20 + 20 + 5 | 65 |
| a | a | b | b | 20 + 20 + 10 + 10 | 60 |
| a | a | b | c | 20 + 20 + 10 + 5 | 55 |
| a | b | b | b | 20 + 10 + 10 + 10 | 50 |
| a | b | b | c | 20 + 10 + 10 + 5 | 45 |
| a | b | c | c | 20 + 10 + 5 + 5 | 40 |
| b | b | b | b | 10 + 10 + 10 + 10 | 40 |
| b | b | b | c | 10 + 10 + 10 + 5 | 35 |
| b | b | c | c | 10 + 10 + 5 + 5 | 30 |
| b | c | c | c | 10 + 5 + 5 + 5 | 25 |
| c | c | c | c | 5 + 5 + 5 + 5 | 20 |

a, b, c = 5, 10, 20 SWITCHING POSSIBILITIES

Fig. 4

United States Patent Office 3,536,849
Patented Oct. 27, 1970

3,536,849

MULTI-STAGE CROSSPOINT SWITCHING NETWORK WITH HOMOGENEOUS TRAFFIC PATTERN

Hilmar Schönemeyer and Helmut Willrett, Ditzingen, Wurttemberg, Germany, assignors to International Standard Electric Corporation, New York, N.Y., a corporation of Delaware Continuation of application Ser. No. 363,766, Apr. 30, 1964. This application Aug. 22, 1968, Ser. No. 784,271
Claims priority, application Germany, May 11, 1963, St 20,598
Int. Cl. H04q 3/68
U.S. Cl. 179—18 3 Claims

ABSTRACT OF THE DISCLOSURE

A plurality of cascaded matrices are interconnected to provide a switching network. Parallel ones of said cascaded matrices are divided to provide routes through the network. A distribution point is included between the primary and secondary stages in each route to enable a cross wiring which causes a homogeneous flow of traffic through that route. Thus, by simply rewiring the cross connections, the network may be made larger or smaller without changing the homogeneity of the traffic patterns.

Figure 1:
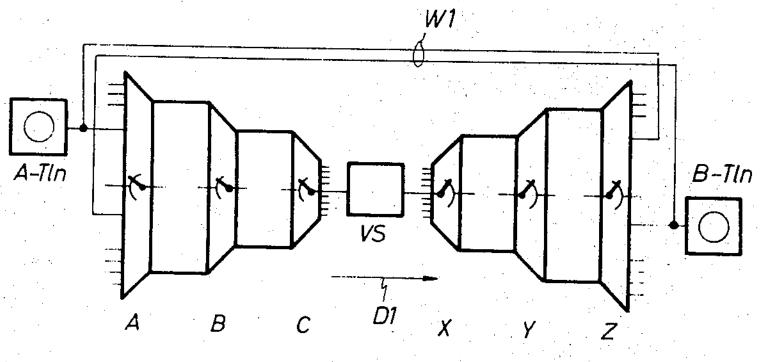

This application is a continuation of Ser. No. 363,766 filed Apr. 30, 1964 and now abandoned.

The invention relates to multi-stage crosspoint switching networks and more particularly to networks designed for use in either electronic or quasi-electronic switching systems having homogeneous traffic patterns.

A "switching network" is a device for selectively extending electrical paths from any inlet to any outlet. Each path is extended through the network by way of a number of switching contact sets commonly called "crosspoints." Since these crosspoints are the most numerous items in the switching network, an increase in efficiency of crosspoint usage and control offers a very fertile field for cost reduction. Moreover, it should be possible to install a minimum crosspoint system which may be economically enlarged by small additions while maintaining crosspoint efficiency and the original basic network configuration.

Traditionally, switching networks have used devices which do not permit practical crosspoint minimization and do not raise problems of efficiency. For example, a truly efficient use of crosspoints, when using electromechanical switching components (such as a crossbar switch), might require very small switches and numerous switching stages. If this were done, however, the number of magnets, plus the added control circuitry for multistage switching, become the controlling criteria of network cost. Therefore, these prior switches cannot economically be reduced to the small size desired. Moreover, it is not economically feasible to vary the capacity of switches after production tooling is acquired. Thus, except in large, multi-thousand line networks, a network designer is prevented from doing very much to increase efficiency of the crosspoint.

With the advent of modern types of crosspoint switches and crosspoint matrices, the designer has been freed from the necessity for using large, inflexible standard size switching units. For example, matrices employing glass-reed or semi-conductor crosspoints may be made larger or smaller by the simple expedient of adding or subtracting crosspoints to an arrangement of any convenient geometrical pattern. In particular, some recently developed electronic switching systems utilize semiconductor crosspoints having the ability to select themselves. This means that extensive in-network crosspoint controls are no longer required; thus, the efficiency of crosspoint usage becomes the basic criterion of network cost and the key to achieving maximum cost reduction of an entire switching system.

When switching networks are designed to use a plurality of matrices having an optimum number of inlets and outlets, the individual matrix tends to be quite small (such as 10 inlets, for example). Unfortunately, however, when the matrices become this small, the traffic through any one matrix tends to no longer be a true statistical sample. Some of the matrices become saturated with traffic while others lie idle. Thus, many of the savings of an efficient sized matrix are lost due to a lack of homogeneity in traffic patterns.

Accordingly, an object of this invention is to provide new and improved multistage switching network. More particularly, an object of the invention is to provide new and improved electronic or glass reed switching matrices. In this connection, an object is to increase the efficiency of individual crosspoints. Here, an object is to provide switching networks having homogeneous traffic patterns.

In accordance with one aspect of this invention, a switching network is comprised of a plurality of cascaded switching stages. Each stage includes a number of matrices, each matrix having a uniform geometric configuration which is of an optimum size and provides maximum efficiency. Since such optimized matrices may be exceedingly small for the network involved, any individual matrix may cease to display the probability characteristics of a truly random sample.

To overcome this problem and yet provide optimized matrixes with traffic patterns that would occur in a truly random sample, the invention contemplates a regrading of subscriber line appearances between the first two of the cascaded switching stages. This regrading makes the primary stage behave more nearly as a truly homogeneous array of crosspoints would behave. Since this makes the first cascaded stage more homogeneous, the succeeding stages follow a conventional switching pattern.

Figure 2:
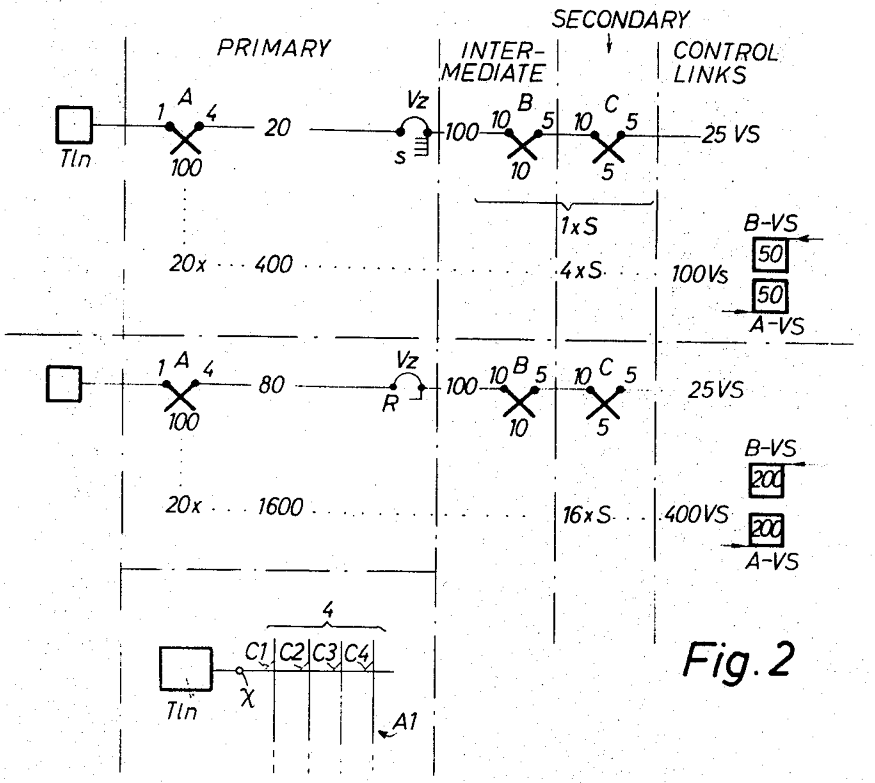
Figure 3:
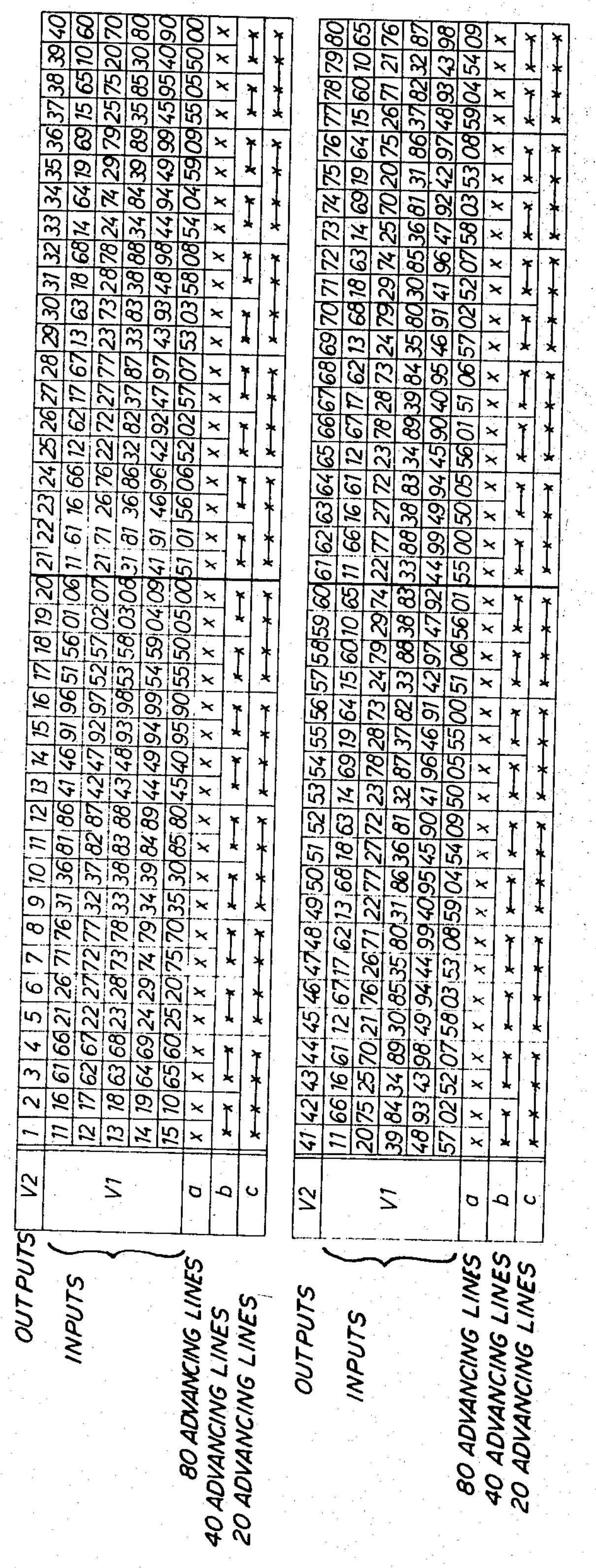

The above mentioned and other features of this invention and the manner of obtaining them will become more apparent, and the invention itself will be best understood by reference to the following description of an embodiment of the invention taken in conjunction with the accompanying drawings, in which:

FIG. 1 is a block diagram which schematically shows the concentration and expansion of traffic in a switching network of a telephone exchange;

FIG. 2 symbolically shows two examples of how switching networks may be arranged to serve traffic of either maximum or minimum density;

FIG. 3 is a table which explains how to arrange the crosspoints in a primary switching matrix to provide a homogeneous crosspoint array; and FIG. 4 is a table which shows a possible way of connecting the outputs in a switching network according to the teaching of FIG. 3.

FIG. 1 is a block diagram which explains how traffic is concentrated and expanded in a telephone system. The disclosure is generic and applies to any type of switching system. Calls progress (in the direction of the arrow D1) from a calling subscriber line (such as A–T*ln*) through a plurality of cascaded switching stages to a called line B–T*ln*. The wires W1 indicate that each subscriber line T*ln* has both an originate (finder) and a terminate (connector) appearance in the network. The purpose of the first three stages A, B, C is to concentrate the traffic from a relatively large number of subscriber lines to a relatively small number of control links VS. The purpose of the stages X, Y, and Z is to expand the traffic from the relatively small number of control links VS to a relatively large number of subscriber lines.

It may be assumed that a practical telephone system provides a number of links (such as VS) which is approximately 5% to 10% of the number of subscriber lines. Thus, it should be clear that most of the network crosspoints are located in the stages or parts of the switching network which is adjacent the subscriber lines. These are the switching stages A and Z. Since no one subscriber uses his telephone more than a small fraction of the total day, it should also be clear that this is the part of the network where the traffic is least intense. On the other hand, the least number of crosspoints are in the switching stages (C, X) adjacent the link circuits VS where the traffic is most intense. Thus, there is substantial economy in a switching system which can reduce the number of crosspoints in the stages A, Z relatively to the number of crosspoints in the stages C, X without losing switching efficiency. Moreover, the network should be constructed in a manner such that it may be enlarged in any one or more stages to serve increased traffic without requiring any substantial change in existing switching networks.

In accordance with the principles of the invention, the crosspionts in a switching network may be distributed as disclosed in FIG. 2. This figure is divided horizontally by a heavily inked, dot-dashed line. A switching network which is capable of handling a minimum traffic density is shown above the heavily inked line, and a maximum traffic density switching network is shown below the line. FIG. 2 is also divided vertically by four lightly inked, dot-dashed lines which separate the network into primary, intermediate and secondary cascaded switching stages. These stages correspond to the switching stages A, B, C of FIG. 1. Moreover, it should be understood that a mirror image of FIG. 2 (not shown) would extend to the right of the network here shown to provide the FIG. 1 stages X, R, Z.

Arbitrarily, it is assumed that each of the switching networks of FIG. 2 serves 2,000 subscriber lines. Each subscriber line is connected to a single input in the primary switching stage A. Each switching stage is shown by a heavily inked X-mark—with the stage A mark having the numerals 1, 100 and 4 adjacent thereto. The numerals 1 and 4 indicate that one inlet has access to 4 outlets. An equivalent showing is made at A1 (FIG. 2) where the telephone subscriber line T*ln* is connected through a single inlet *x* to four outlets via four crosspoints switches C1–C4. The numeral 100 (shown below the heavily inked X-mark) indicates that each switching matrix in stage A serves 100 inlets.

The number of inter-stage wires leading from a primary stage A to an intermediate stage B depends upon the traffic density which is expected from the subscriber lines T*ln*. The numbers 20 and 80 in the paths from stage A to stage B indicate that any number, from 20 to 80, of interstage paths may be provided depending upon the degree of traffic between minimum and maximum traffic density conditions.

The initial assumption was that 2,000 subscriber lines are served by a plurality of 100 inlet, primary stage, matrices. Therefore, the primary stage includes twenty such hundred line matrices. Since the minimum traffic density network provides each primary matrix with twenty paths to the intermediate stage matrices, the numerals above the dot-dashed line are 20×20 or 400 inter-stage wires. In the maximum density network below the horizontal dot-dashed line, each of the twenty primary stage matrices is provided with eighty paths to the intermediate stage. Thus, there at 20×80 or 1600 such paths. Thus, the concentration of the network above the horizontal dot-dashed line of FIG. 2 is from 2000 inlets to 400 outlets while the concentration below the horizontal dot-dashed line is from 2000 inlets to 1600 outlets.

The intermediate and secondary stages B, C of FIG. 2 are shown by a symbology which is the same as that used in the primary stage. That is, heavily inked X-marks with adjacent numerals explain the inlet-outlet conditions.

Viewed as a whole, the cascaded switching array with the designated numbers of inlets, outlets, and stages, shown above the horizontal dot-dashed line, may be aptly termed a "route." Thus, FIG. 2 shows two exemplary routes—one (above the horizontal line) for minimum and one (below the horizontal line) for maximum traffic density. The upper route of FIG. 2 includes a total of twenty paths—19 of which are not shown.

Under the present assumptions, the 2000 subscriber lines have access to 25 links VS. If, as it conventional, the line T*ln* can reach only the links connected to the right-hand end of the one exemplary route shown above the horizontal dot-dashed line, there could be a serious imbalance of traffic where some routes are always rejecting or blocking calls because of all busy conditions, and other routes are not sufficiently used. Heretofore, the solution to this problem has led the traffic engineers to prescribe larger and less efficient primary stage matrices.

According to the invention, the smaller and more efficient primary stage matrices are connected to a wiring distributor frame V*z* so that each line "sees" each link. At this frame, outlet treminals from the primary stage are jumped to inlet terminals of the intermediate stage in a manner which distributes the traffic leaving the primary stage as homogeneous as it would be if the larger, less efficient matrices were used. The construction of every primary stage matrix is the same and is independent of the traffic density. The total crosspoint arrangement of the entire primary stage is wired to provide homogeneity and, thus, to serve all traffic conditions. For example, a switching network may be installed initially to serve the minimum traffic density system such as that shown above the horizontal dot-dashed line. Thereafter, as traffic increases, the system may be expanded incrementally and gradually to become the maximum traffic density system shown below the horizontal dot-dashed line. As the system grows, the concentration of outputs can be redivided at the frame V*z*, and led into new routes. It should be noted that if the primary stage has homogeneity, the design of the remaining stages becomes very simple. This increases the switching capabilities and reduces the cost of the crosspoint network—particularly in the primary stage.

FIG. 3 shows how to distribute 100 inputs 11 . . . 00 to the outputs 1 . . . 80 in a primary matrix. FIG. 3 further shows a switching scheme, whereby V1 indicates an input and V2 an output. The letters *a*, *b*, and *c*, for example, indicate three switching possibilities for the outputs 1 . . . 80, so that for example 80, 40, or 20 advancing lines are obtained. Since four crosspoints are associated with each of the hundred subscribers, five crosspoints are provided for each of the 80 outputs. The output 1 for example can be connected via the crosspoints with the subscribers 11, 12, 13, 14, and 15; the output 2 with the subscribers 16, 17, 18, 19, and 10, etc. For simplicity, the switching matrices are formed with one hundered crosspoints, e.g. for the outputs 1 to 20, 21 to 40, 41 to 60, and 61 to 80.

In each matrix, each input line is found only once.

To increase the capability of the crosspoint arrangement, the input terminals must be selected for a certain line (e.g. 11) in such a way that a maximum number of subscriber lines can reach the outputs for the subscriber line (e.g. 11). For example, the subscriber line 11 is connected with the outputs 1, 21, 41, and 61. These outputs, however, can also be reached by the inputs 12, 13, 15; 21, 31, 41, 51; 20, 39, 48, 57; and 22, 33, 44, 55. In order to obtain this capability for all subscribers, another cycle of connections can be selected in the different matrices from the same subscriber number, as shown in FIG. 3. One cycle advances in each matrix with a different number of steps in the figure scale 11 . . . 00 of the one hundred subscriber lines. In a similar way, one can design other matrices with more or less inputs and outputs and, consequently, more or less crosspoints.

In a matrix wired together according to FIG. 3, the crosspoint arrangement still remains capable of handling the traffic when the outputs are concentrated. When concentrating according to the line designated *b* (in FIG. 3), the double output 1–2 can be reached by the subscribers 11, 12, 13, 14, 15, 16, 17, 18, 19, 10. The double outputs 21–22, 41–42, and 61–62 contain other subscriber numbers. In like manner, a concentration according to the line marked *c*, in FIG. 3, the quadruple output 1–2–3–4 can be reached by the subscribers 11, 12, 13, 14, 15, 16, 17, 18, 19, 10, 61, 62, 63, 64, 65, 66, 67, 68, 69, 60. The quadruple ouputs 21–22–23–24, 41–42–43–44, and 61–62–63–64 only include the subscribers 16, 61, and 66, while the other 16 subscribers always differ. From this flexibility, a capable crosspoint arrangement can be realized at each switching arrangement.

Finally, Fig. 4 shows how such a matrix with one hundred inputs and a maximum of eighty outputs V2 can be switched in different ways, so that the number of eighty outputs can be incrementally reduced to twenty outputs. The design with twenty outputs will be selected in switching systems with a low traffic density, while the design with eighty outputs will be selected for maximum traffic density. The letters *a, b, c* represent the same switching patterns in FIGS. 3, 4 and designate the patterns for the four line sub-groups 1–20, 21–40, 41–60 and 61–80.

According to the invention, the design of the switching stage A and the design of the routes is not decisive. The example described herein (for an exchange system with 2000 subscriber lines) should not be considered as a limitation upon the crosspoint arrangement. The essential feature of the crosspoint arrangement is that the subscriber group is designed to be independent of the actual traffic density. It is switched only according to the traffic to be handled.

While the principles of the invention have been described above in connection with specific apparatus and applications, it is to be understood that this description is made only by way of example and not as a limitation on the scope of the invention.

What is claimed is:

1. A multi-stage switching network including input terminals connected to subscriber lines, and output terminals connected to trunks or junctors, wherein the improvement comprises, a primary switching stage connected to individual input terminals and providing for each input terminal a predetermined number of crosspoints connectable to a predetermined number of outlets, said number of crosspoints and number of outlets being chosen according to the maximum traffic density to be expected, means for subdividing an intermediate stage of the switching network into a plurality of independent grids, each of said grids having the same predetermined number of inlets as other grids and the same predetermined number of outlets as other grids, interstage paths extending between outlets of said primary switching stage and the inlets of said grids, means for connecting to each of said interstage paths a predetermined number of outlets of said primary switching stage, said number of outlets connected being chosen according to the traffic density expected, and means for connecting each of said interstage paths to one of the inlets of one of said grids.

2. A network as claimed in claim 1, in which four outlets are provided at the primary switching stage for each inlet, and twenty outlets of the primary switching stage are provided to the interstage paths.

3. A network as claimed in claim 1, in which four outlets are provided at the primary switching stage for each inlet, and eighty outlets of the primary switching stage are provided to the interstage paths.

References Cited

UNITED STATES PATENTS

| | | |
|---|---|---|
| 3,124,655 | 3/1964 | Feiner. |
| 3,201,520 | 8/1965 | Bereznak. |
| 3,217,107 | 11/1965 | Schorum. |

WILLIAM C. COOPER, Primary Examiner